United States Patent [19]

Henry

[11] Patent Number: 5,436,804
[45] Date of Patent: Jul. 25, 1995

[54] LIGHT-MODIFYING SCREEN FOR USE IN PHOTOGRAPHY

[76] Inventor: Sean B. J. Henry, 12 Hope Drive, The Park, Nottingham NG7 1DL, England

[21] Appl. No.: 15,561

[22] Filed: Feb. 9, 1993

[30] Foreign Application Priority Data

May 27, 1992 [GB] United Kingdom ............... 9211186

[51] Int. Cl.⁶ ............................................. G03B 15/02
[52] U.S. Cl. ................................. 362/16; 362/18; 362/320; 362/450
[58] Field of Search ............... 362/16, 18, 320, 352, 362/450; 160/351, 354, 368.1, 368, 371, 372, 373, 377; 359/443–449, 450, 461

[56] References Cited

U.S. PATENT DOCUMENTS

| | | | |
|---|---|---|---|
| 1,679,443 | 8/1928 | Olson et al. | 160/37 |
| 2,532,837 | 12/1950 | DePoy | 160/377 |
| 2,717,036 | 9/1955 | Harris | 160/354 |
| 3,002,557 | 10/1961 | Roth et al. | 160/377 |
| 4,446,506 | 5/1984 | Larson | 362/18 |
| 4,524,405 | 6/1985 | Heard | 362/320 |
| 4,633,374 | 12/1986 | Waltz et al. | 362/18 |
| 4,731,716 | 3/1988 | Chang | 362/352 |
| 5,128,838 | 7/1992 | Brandess | 362/18 |
| 5,154,503 | 10/1992 | Sternsher | 362/16 |
| 5,226,726 | 7/1993 | Chen | 362/352 |

FOREIGN PATENT DOCUMENTS 627583  3/1936  Germany ............... 160/377

*Primary Examiner*—Richard R. Cole
*Attorney, Agent, or Firm*—Frijouf Rust & Pyle

[57] ABSTRACT

A light modifier is disclosed for use in photography, comprising a frame and a screen supported by the frame. The frame comprises a spine member with first and second limbs pivotally connected to the spine member at spaced apart locations thereon. The frame is mounted on an external support with the first and second limbs retaining in screen supporting positions substantially orthogonal to the spine member such that the screen is tensioned between the first and second limbs. The first limb is seated in a first bracket attached to the spine member and the second limb is seated in a second bracket attached to the spine member. The first and second tubular collars are slidingly mounted on the first and second limbs respectively, the first and second tubular collars fitting when the first and second limbs are in the screen supporting position, over apexes of the first and second brackets respectively so as to prevent pivotal movement of the first and second limbs.

18 Claims, 2 Drawing Sheets

FIG. I.

LIGHT-MODIFYING SCREEN FOR USE IN PHOTOGRAPHY

This invention relates to a screen for use in photography, in particular to a screen of the type commonly known as a scrim or flag, used to modify the light from a continuous light source.

In both motion picture and still photography it is frequently desirable to modify the light from a continuous light source. For example, it is frequently desirable to utilise diffused light and to this end the light may be passed through a translucent screen to break up or diffuse the light rays, or to reduce the amount of incident light. In other circumstances, it may be desirable to partially block the light from a light source.

The modification of light in this way is generally the responsibility of the member of a film crew known as the grip, and the equipment used is known as grip equipment. One widely used such piece of equipment is a screen known, when it is translucent and used to diffuse or to reduce the intensity of the light, as a scrim or, when opaque and used to block light, as a flag. Such screens are positioned in front of the light source and will hereinafter be referred to simply as scrims.

Typically, a scrim comprises a rigid metal frame which supports and tensions a textile screen. The scrim is generally rectangular with the frame extending along three sides of the rectangle. The frame is also provided, usually in the middle of one of the shorter sides, with a fitting by means of which it can be secured to a stand for positioning in front of the light source.

A disadvantage of such known scrims is that they are relatively bulky and hence not very portable. In addition, the textile screen can easily suffer damage during transit, and may be relatively difficult to replace.

There has now been devised an improved form of scrim which overcomes or substantially mitigates the above-mentioned disadvantages.

According to the invention, there is provided a light modifier for use in photography, comprising
a frame; and
a screen supported by said frame;
wherein said frame comprises
a spine member;
first and second limbs pivotally connected to said spine member at spaced apart locations thereon;
means for mounting said frame on an external support; and
means for retaining said first and second limbs in screen supporting positions substantially orthogonal to said spine member, such that said screen is tensioned between said first and second limbs.

The light modifier according to the invention is advantageous primarily in that the pivotal connection of the first and second limbs to the spine member enables it to be folded to a collapsed condition. When not in use, the light modifier is thus compact and can be easily transported. Also, the likelihood of damage to the frame and/or screen is reduced.

The light modifier may be utilised in all forms of photography, including motion picture and still photography, as well as video recording or television.

The screen may be translucent or opaque, and is preferably removably mounted on the frame. To this end, the screen is preferably provided at two of its edges with tubular edgings into which the first and second limbs are inserted. In addition, the screen is preferably provided at a third edge with means for securement to the spine member. Most preferably, this takes the form of a fabric or other edging which can be folded around the spine member and secured by means of a releasable fastener. Most conveniently, the releasable fastener is of the type comprising strips of interlocking loops and hooks, eg that sold under the trade mark VELCRO.

The fourth edge of the screen, ie the edge opposite to the spine member, is preferably provided with support means to maintain that edge taut. The fourth edge may, for example, be elasticated. Alternatively, a thin plastics line or a wire may be incorporated into the fourth edge. Such a line or wire may be secured by, for example, stitching at, or close to, the fourth edge.

The invention will now be described in more detail, by way of illustration only, with reference to the accompanying drawings, in which FIG. 1 is a view in front elevation of a scrim according to the invention;

Figure 1:
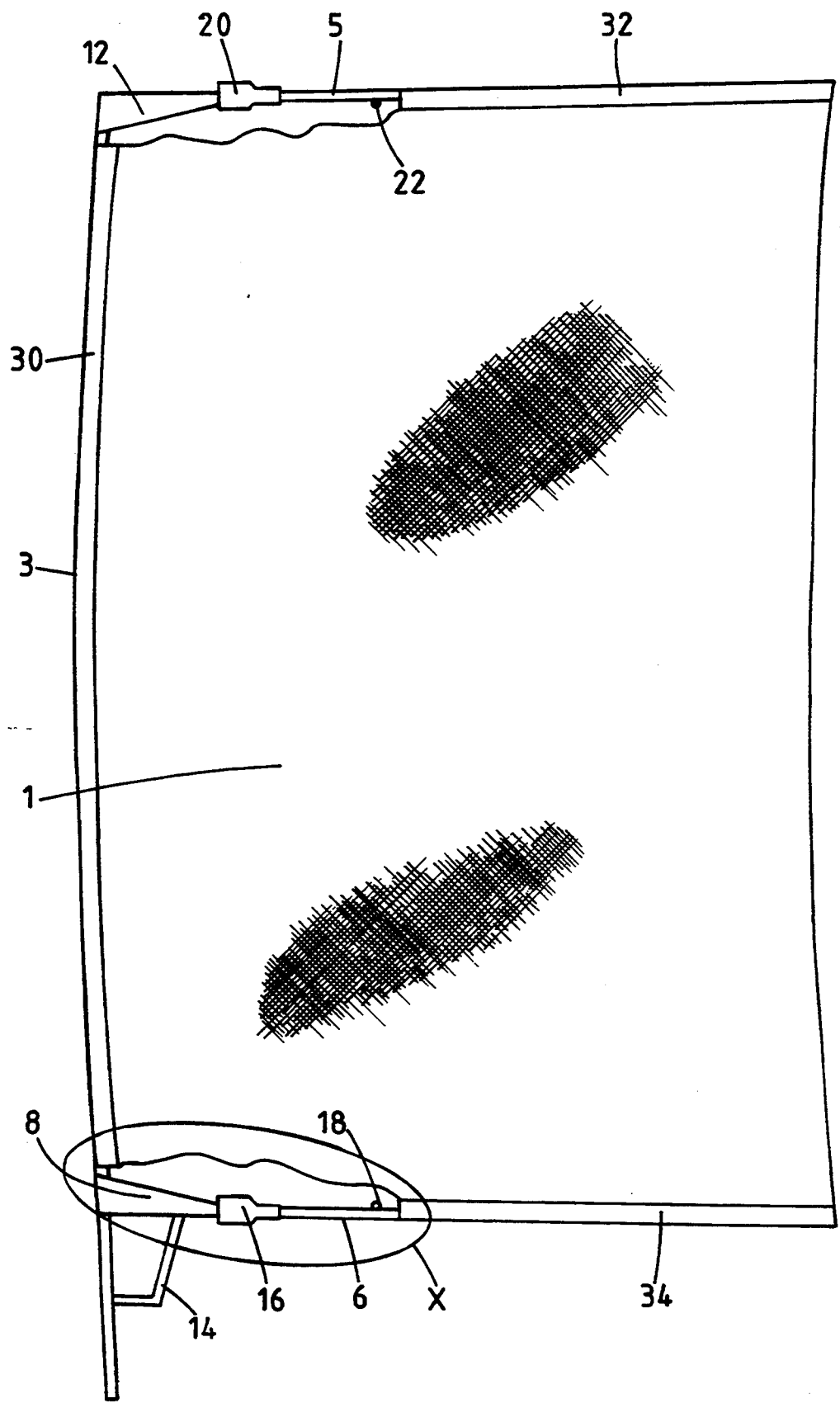

Referring first to FIG. 1, a scrim for use in motion picture photography comprises a rigid three-sided frame which supports and tensions a filter screen 1 of translucent textile material.

The frame comprises a spine 3 to which are pivotally connected upper and lower limbs 5,6. The dimensions of the frame may vary widely depending on the application for which it is to be used. However, in one embodiment, the spine 3 is approximately 90 cm in length and the upper and lower limbs 5,6 are approximately 60 cm long, the lower limb 6 being spaced from the end of the spine 3 by about 15 cm.

Figure 2:
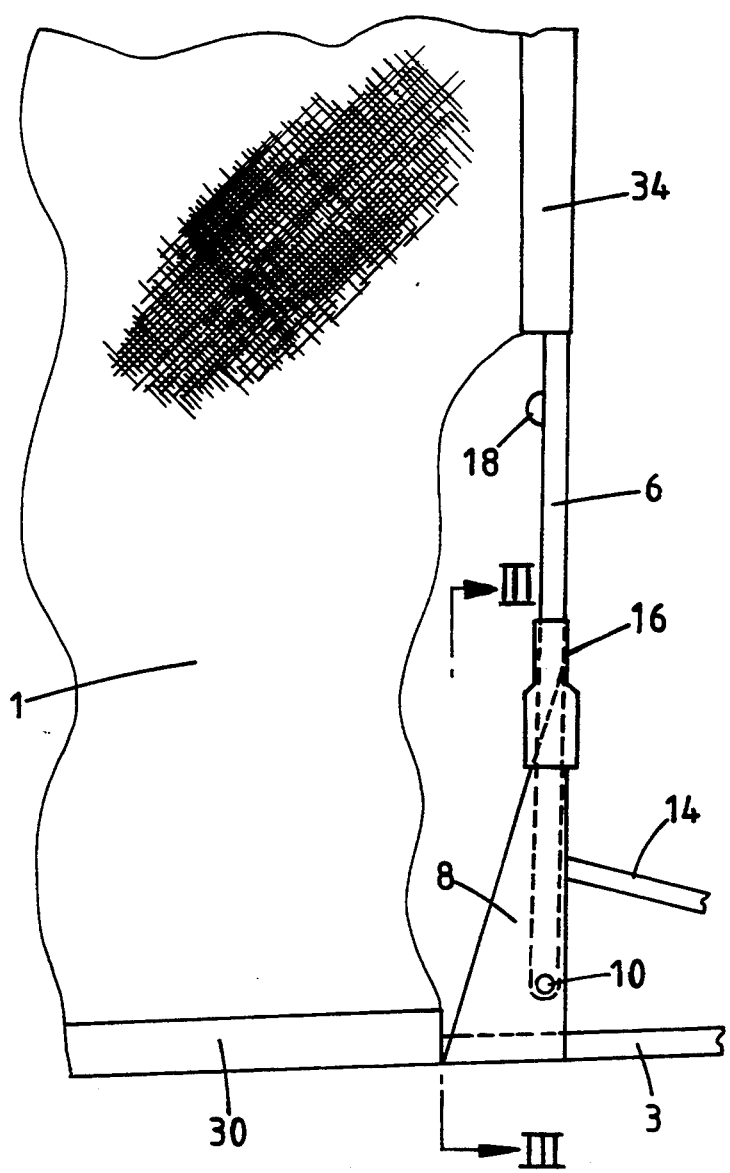
FIG. 2 is a view on a larger scale of the portion of the scrim enclosed within the circle X in FIG. 1.
Figure 3:
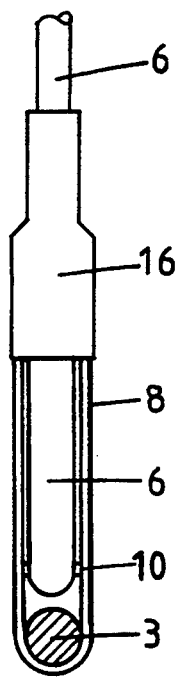
FIG. 3 is a view on the line III—III in FIG. 2.

As can be seen most clearly from FIGS. 2 and 3, the lower limb 6 is seated in a generally triangular first bracket 8 which is welded to the spine 3. The walls of the first bracket 8 define a channel within which the lower limb 6 is held captive by a rod 10 passing through a bore near the end of the lower limb 6. The rod 10 is held in sockets formed in the internal surfaces of the walls of the first bracket 8 and the lower limb 6 pivots about it.

The upper limb 5 is similarly seated in a second bracket 12 welded to the end of the spine 3.

The lower end of the spine 3 is connected to the first bracket 8 by a web 14 so as to form a fitting by means of which the frame can be secured to a conventional stand.

In use, the lower limb 6 is held in the erected position by means of a sliding tubular collar 16 which fits over the apex of the first bracket 8, preventing pivotal movement of the lower limb 6. Movement of the collar 16 is limited by a projecting stop 18 provided on the lower limb 6.

The upper limb 5 is similarly held in the erected position by a collar 20, movement of which is limited by a stop 22.

The filter screen 1 is provided with tubular edgings 30,32,34 on the edges corresponding to the spine 3, and upper and lower limbs 5,6 respectively. The edgings 32 and 34 comprise folded bands of textile material stitched to the edge of the screen 1 and closed at the ends remote from the spine 3. The edging 30 comprises a band of textile material stitched along one edge to the screen 1 and provided with a VELCRO-type fastener by means of which the band can be formed into a tube.

A degree of rigidity is conferred on the fourth edge of the screen 1, ie the edge opposite to the spine 3, by a wire which is secured to the screen 1 at that edge by stitching.

In use, the assembled scrim is transported in a collapsed state in which the upper and lower limbs 5,6 lie substantially flush with the spine 3. When the scrim is to be used, the upper and lower limbs 5,6 are moved to the position shown in FIG. 1 and the collars 16,20 slipped over the ends of the corresponding brackets 8,12. The scrim is then mounted on a conventional stand.

Figure 4:
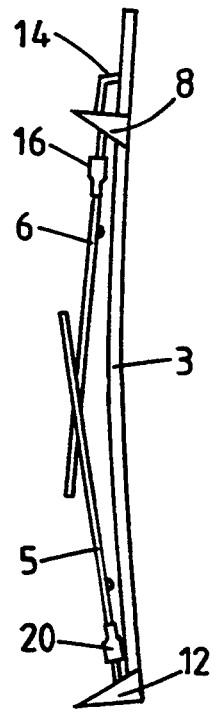
FIG. 4 shows the frame forming part of the scrim of FIG. 1 in a collapsed condition.

After use, the collars 16,20 are moved towards the respective stops 18,22 and the limbs 5,6 folded to the collapsed position as shown in FIG. 4.

It can be seen from FIG. 4 that in the collapsed state the frame is very compact. It will also be noted that the spine 3 is bowed slightly in order to ensure proper tensioning of the filter screen 1 when the scrim is assembled and erected.

To fit the screen 1 onto the frame, the upper and lower limbs 5,6 are slid into the tubular edgings 32,34. The remaining edging 30 is then folded around the spine 3 and secured by means of the VELCRO-type fastener. In this way, a damaged screen may easily be replaced, or a variety of screens may be used with a single frame.

I claim:

1. A light modifier for use in photography, comprising a frame; and
    a screen supported by said frame;
    said frame comprising a spine member;
    first and second limbs pivotally connected to said spine member at spaced apart locations thereon;
    means for mounting said frame on an external support; and
    means for retaining said first and second limbs in screen supporting positions substantially orthogonal to said spine member, such that said screen is tensioned between said first and second limbs;
    wherein said first limb is seated in a first bracket attached to said spine member and said second limb is seated in a second bracket attached to said spine member and wherein first and second tubular collars are slidingly mounted on said first and second limbs respectively, said first and second tubular collars fitting when said first and second limbs are in said screen supporting position, over apexes of said first and second brackets respectively so as to prevent pivotal movement of said first and second limbs.

2. A light modifier as claimed in claim 1, wherein said screen is translucent.

3. A light modifier as claimed in claim 1, wherein said screen is opaque.

4. A light modifier as claimed in claim 1, wherein said screen is removably mounted on said frame.

5. A light modifier as claimed in claim 4, wherein said screen is provided at two of its edges with tubular edgings into which said first and second limbs are inserted.

6. A light modifier as claimed in claim 4, wherein said screen is provided at two of its edges with tubular edgings into which said first and second limbs are inserted, and at a third edge with means for securement to said spine member.

7. A light modifier as claimed in claim 4, wherein said screen is provided at an edge thereof with a fabric or other edging which can be folded around said spine member, said edging being provided with a releasable fastener.

8. A light modifier as claimed in claim 1, wherein said first bracket is generally triangular.

9. A light modifier as claimed in claim 1, wherein said first limb is held captive within said first bracket by a rod passing through a bore near an end of said first limb, said rod being held in sockets formed in the internal surfaces of the walls of said first bracket such that said first limb pivots about said rod.

10. A light modifier as claimed in claim 1, wherein said, second bracket is generally triangular.

11. A light modifier as claimed in claim 1, wherein said second limb is held captive within said second bracket by a rod passing through a bore near an end of said second limb, said rod being held in sockets formed in the internal surfaces of the walls of said second bracket such that said second limb pivots about said rod.

12. A light modifier as claimed in claim 1, wherein an end of said spine member is connected to said first bracket by a web so as to form a fitting by means of which said frame can be secured to an external support.

13. A light modifier as claimed in claim 1 wherein there is provided a projecting stop on said first limb to limit sliding movement of said first collar away from said first bracket.

14. A light modifier as claimed in claim 1, wherein there is provided a projecting stop on said second limb to limit sliding movement of said second collar away from said second bracket.

15. A light modifier as claimed in claim 1, wherein an edge of said screen opposite to said spine member is provided with support means to maintain said edge of said screen taut.

16. A light modifier as claimed in claim 15, wherein said edge of said screen is elasticated.

17. A light modifier as claimed in claim 15, wherein a plastics line or a wire is incorporated into said edge of said screen.

18. A light modifier as claimed in claim 1, wherein, when said first and second limbs are not retained in said screen supporting position and said screen is not tensioned between said first and second limbs, said spine member is bowed concave to the space between said first and second limbs.

* * * * *